Dec. 18, 1962    J. E. PASTORET ET AL    3,069,606
ELECTRIC DRIVE LOCOMOTIVE WHEEL SLIP LIMITATION
Filed Oct. 6, 1959
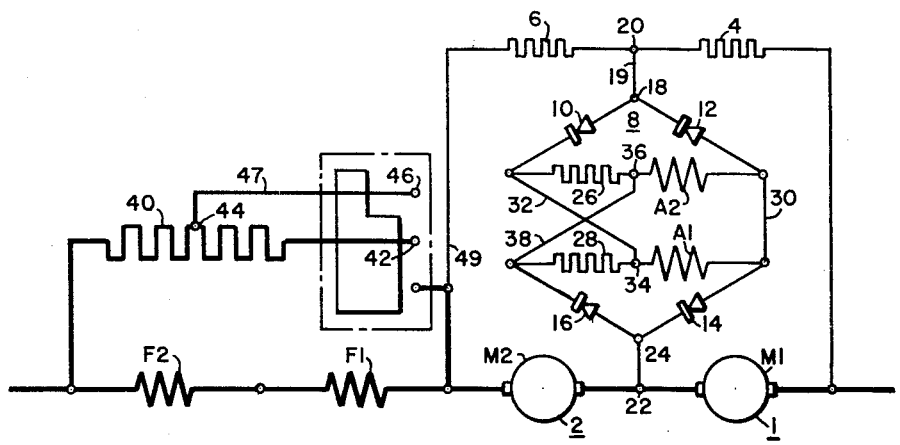
WITNESSES:
E. Herbert Liss
James F. Young
INVENTORS
John E. Pastoret and
Herman C. Krapf.
BY
ATTORNEY

United States Patent Office 3,069,606
Patented Dec. 18, 1962

3,069,606
ELECTRIC DRIVE LOCOMOTIVE WHEEL SLIP LIMITATION
John E. Pastoret and Herman C. Krapf, Wilkinsburg, Pa., assignors to Westinghouse Electric Corporation, East Pittsburgh, Pa., a corporation of Pennsylvania
Filed Oct. 6, 1959, Ser. No. 844,800
3 Claims. (Cl. 318—52)

The invention relates generally to motors for traction vehicles, and more particularly, to a control means for a traction motor which prevents the motor on a slipping wheel from exceeding a safe operating speed.

This invention is particularly useful on a car or train of cars adapted to be driven on ice or snow in sandy, desert type terrain or other places where the adhesion coefficient is low and slipping of wheels may be encountered. It will, of course, be understood that the invention is applicable to cars and trains of cars used for other purposes either on or off of rails. In this particular application, however, it is most likely that one wheel of a pair of wheels is likely to ride over a crevice or to slip on the snow, ice, or sand. The motor driving the slipping wheel will increase in speed, absorbing a larger portion of the applied voltage, thereby decreasing the voltage across the motor connected in series with it. Opposite wheels on this type of vehicle are usually driven by a pair of D.C. series motors connected in series with each other to provide an electrical differential. As the slipping speed increases, the current taken by the motor decreases, decreasing the series field excitation, with a corresponding increase in the speed of the slipping wheel. This action is cumulative and can continue until substantially all of the applied voltage is across the slipping motor, and the speed of the motor may increase to a value which is above the safe operating speed.

The increase in voltage across the slipping motor may cause an electrical breakdown and the increase in speed may cause a mechanical failure. This same action can take place in case of a broken gear, a broken chain or belt drive or any other mechanical failure which will cause the speed of one motor to increase materially above that of the motor with which it is connected in series.

It is of course apparent that there are times when one of the motors connected in series must operate at a higher speed than its corresponding motor. For example, when a car is traveling in a curved path, the wheel on the outer side of the curve must travel faster than the wheel on the inner curve. Therefore, the motor on the outer periphery of the curve must maintain a higher speed. Thus a problem arises. Means must be provided to limit the speed of one motor with respect to the other in order to prevent electrical failure or mechanical failure. On the other hand, a certain predetermined difference in speed must be permitted.

The principal object of the present invention is to provide a control scheme which protects the motor against excessive voltage and excessive speeds above a predetermined value.

Another object of the present invention is to provide a control scheme which utilizes auxiliary fields for each motor of a pair of traction motors, which fields are excited in response to differences in speeds of the motor, in excess of a predetermined value, thereby preventing excessive speed of either motor.

A further object of the invention is to provide a control scheme for a pair of traction motors which will provide positive limitation of voltage across either motor and positive limitation of motor speed by the utilization of auxiliary fields having resistors in series therewith, which fields are excited in response to differences in speed of the motors.

A still further and more specific object of the invention is to provide a control scheme for a pair of traction motors which utilizes a resistance bridge having the armatures of the motors constituting one pair of legs thereof, to sense the differences in speeds of the two motors, and which utilizes a network across the null point of the bridge which includes auxiliary field windings in series with resistors for the two motors and which is excited in response to differences of speed between the two motors.

Other objects and advantages of the invention will be apparent from the following detailed description of the invention, taken in connection with the accompanying drawing, the single FIGURE of which is a schematic diagram of the electric motor control circuits for a traction vehicle incorporating the present invention.

Referring now to the schematic diagram, there is shown a bridge circuit 3 comprising a resistor 4 in one leg thereof and a resistor 6 in another leg thereof. Motors 1 and 2 having armatures designated M1 and M2, respectively, connected in series, comprise the other two legs of the resistance bridge, the motors driving different wheels of a vehicle. In series with the motor armatures M1 and M2 are their series fields designated F1 and F2, respectively.

A network 8 including auxiliary field windings for motors 1 and 2 designated A1 and A2, respectively, resistors in series with the auxiliary windings, and rectifiers is connected across the null point of the bridge 3. Network 8 includes rectifiers 10, 12, 14 and 16.

As clearly shown in the drawing, the network 8 comprises a pair of rectifiers 10 and 12 connected together as at 18 shown in the drawing and conductive in opposite directions with respect to the point 18. Point 18 is connected as at 20 to intermediate resistors 4 and 6 as can be seen on the drawings. Included in network 8 is another pair of rectifiers 14 and 16 connected at 24 as shown on the drawing and conductive in opposite directions with respect to the point 24. Point 24 is connected to the bridge 3 at 22 intermediate the motor armatures M1 and M2. A resistor 26 is connected in series with the auxiliary winding A2 and a resistor 28 is connected in series with the auxiliary field winding A1. The resistor 26 and auxiliary field winding A2 are connected across the rectifiers 10 and 12 as shown in the drawing. The resistor 28 and auxiliary field A1 are connected across the rectifiers 14 and 16 as shown in the drawing. The rectifiers 12 and 14 and the auxiliary field windings A1 and A2 are connected together at one side by a conductor 30. At their ends remote from the auxiliary field winding, resistors 26 and 28 are cross connected. Resistor 26 is connected at its end remote from auxiliary winding A2 to a point 34 intermediate the resistor 28 and the auxiliary field winding A1 by a conductor 32. Resistor 28 is connected at its end remote from the auxiliary field winding A1 to a point 36 intermediate the resistor 26 and the auxiliary field winding A2 by a conductor 38.

Any suitable means may be provided for controlling the motors, such as a motor series field shunt resistor 40 connected across the series fields F1 and F2. In series with the shunt resistor 40 is a switch 42. A top connection is provided on the field shunt resistor at 44 and is connected through a conductor 47, a switch 46 and a conductor 49 to one side of armature M2. The shunt resistor 40 is provided for speed control purposes and is controlled by operation of switches 42 and 46. A direct-current source of power is provided to energize the field F1, F2 and the armature M1 and M2 as well as the bridge 3.

The resistors 4 and 6 in the bridge 3 have the same value of resistance. Thus, it can be seen that when the motors are operating at the same speed, the potential of point 20 is equal to the potential at point 22. Therefore, no current can flow through the network 8. When motor 1 increases in speed relative to motor 2, the potential of point 22 decreases and current flows through the auxiliary fields. When motor 1 is operating at a speed sufficiently greater than motor 2 to provide a sufficient voltage between point 20 and 22, current flows from the positive terminal of the source through the resistor 4 to point 20, through rectifier 10, through the resistor 26 and the auxiliary field A2, through the rectifier 14 to point 22. Another path is from the positive terminal of the direct-current source of supply to the resistor 4, point 20 and through rectifier 10, through auxiliary winding A1 and rectifier 14 to point 22. Thus, it can be seen that when the wheel driven by motor 1 slips and the motor therefore increases its speed, the auxiliary fields of both motor 1 and motor 2 are excited. However, more current passes through the auxiliary field of motor 1 than through the auxiliary field of motor 2 since the auxiliary field of motor 2 has a resistance 26 in series therewith. The resistor 28 in series with auxiliary field A1 of motor 1 is bypassed by the conductor 32.

If motor 2 should lose its load, due to slippage on ice, snow, or sand or due to a broken gear or belt drive or any other reason, its speed would increase. The increase in speed would result in an increased back voltage and a decrease in current through the armature. Motor 2 will absorb a larger portion of the applied voltage, decreasing the voltage across motor 1 connected in series with it. As the slipping speed increases, the current taken by the motor decreases, decreasing its series field excitation with a corresponding increase in the speed of the slipping wheel. This action is cumulative and can continue until approximately the total applied voltage is across the slipping motor and the speed of the motor may increase to a value which is above the safe operating speed.

In this case the potential at point 22 will be greater than that of point 20 in the bridge circuit 3. This will cause current to flow from the positive terminal of the voltage source through the armature of motor 1 to point 22 through rectifier 16, conductor 38 to point 36, through auxiliary field A2, through rectifier 12 to the point 20 intermediate the resistors 4 and 6.

Another path will be from the positive terminal of the voltage source through the armature M1 of motor 1 to point 22 through rectifier 16, through resistor 28 and auxiliary field A1, through rectifier 12 to point 20. It will be seen in this case that, again, both the auxiliary fields of motor 1 and motor 2 are excited. It will also be noted that due to the arrangement of the rectifiers 12, 14, 16, and 18, the current through the auxiliary fields will be in the same direction regardless of which motor is slipping. However, if motor 2 is slipping, the auxiliary field A1 will be excited through the resistance 28, while the resistor 26 in series with the auxiliary field A2 will be bypassed by conductor 38.

With the motors 1 and 2 connected in series across the power lines, points 20 and 22 of the resistance bridge 3 are in equipotential relation as long as balanced electrical conditions exist between motors 1 and 2, and no current will flow in the auxiliary windings A1, A2 and their respective resistances 26 and 28. An increase in speed and back voltage of one of the motors 1 or 2, each driving a separate wheel, upon slippage of one wheel, will cause an unbalance in the electrical conditions between the motors 1 and 2 to cause energization of the auxiliary field windings in the manner described above. It should be noted that by arrangement of the rectifiers 10, 12, 14 and 16, current will flow through the auxiliary windings in the same direction regardless of which motor is slipping.

Thus both motors receive some additional excitation. Since the speed of the non-slipping motor has not changed, it generates a back voltage proportional to its speed and excitation. Thus, it is apparent that the voltage across the non-slipping motor cannot become greater than the applied voltage less the back voltage of the non-slipping motor. Therefore, the voltage across the slipping motor is limited. By means of the novel circuit hereinabove disclosed, the voltage across the slipping motor is limited to some predetermined value which can be adjusted to a desired value by proper selection of the resistors 4, 6, 26 and 28. Likewise, the speed of the slipping motor will not increase above that necessary to generate a back voltage equal to the applied voltage less the back voltage of the non-slipping motor. It can thus be seen that by proper selection of the values of the resistors 4, 6, 26, and 28 that maximum voltage across a slipping motor as well as the maximum speed of a slipping motor can be held to a desired value.

The above-described wheel slip control system, utilizes a bridge circuit for sensing differences of speed and utilizes the current flowing due to bridge unbalance across the normally equipotential points of the bridge 3 to excite auxiliary fields for both the slipping and the non-slipping motor. Thereby a means is provided for limiting the speed of the slipping motor, as well as the voltage, to a predetermined value which can be determined by proper selection of the resistors in the bridge and resistors in series with the auxiliary fields.

It will now be apparent that a wheel slip protection scheme has been provided which is suitable for protection of traction motors for operation on ice, snow, sand or under other conditions where the wheel is likely to slip or in cases where a gear may break or other mechanical failure may occur causing the motor to lose its load. This scheme prevents runaway and ultimate destruction of the motor. It makes it possible to use series motors for traction vehicles operating under these conditions.

While a certain specific embodiment of the invention has been shown and described for the purpose of illustration, it will be apparent that various other modifications and embodiments are possible. For example, in some cases, the resistors 28 and 26 might be eliminated and the auxiliary fields A1 and A2 connected in series across the null points 20 and 22 of the bridge 2. Therefore, it will be apparent that various other modifications and embodiments are possible and are within the scope of the invention.

We claim as our invention:

1. In a drive system for a vehicle, the combination including a pair of series traction motors having rotating armatures, a main field winding for each of said motors, an auxiliary field winding for each of said motors, bridge means including a resistance in each of two legs thereof and one of said armatures in each of the other two legs for sensing differences of speed between said armatures, said bridge being substantially balanced when said motors are operating at the same speed and unbalanced when said motors are operating at different speeds with respect to each other, said auxiliary fields connected across the null point of said bridge and being excited upon unbalance of said bridge.

2. In a drive system for a vehicle, the combination including a pair of series traction motors having rotating armatures, a main field winding for each of said motors, an auxiliary field winding for each of said motors, bridge means including a resistance in each of two legs thereof and one of said armatures in each of the other two legs for sensing differences of speed between said armatures, said bridge being substantially balanced when said armatures are rotating at the same speed and being unbalanced when the said armatures rotate at different speeds, network means including said auxiliary fields connected across the null point of said bridge, said network means operative to excite said auxiliary fields when said speed differences exceed a predetermined value.

3. In a drive system for a vehicle, the combination including a pair of series traction motors having rotating armatures, a main field winding for each of said motors, an auxiliary field winding for each of said motors, bridge means including a resistance in each of two legs thereof and one of said armatures in each of the other two legs for sensing differences of speed between said traction motors, a network connected across the null points of said bridge, said network comprising an auxiliary field for each of said motors, a resistor in series with each of said auxiliary fields, rectifier means for directing the current flow in the same direction through said fields when the bridge is unbalanced in either sense, and means for by-passing one resistor when the bridge is unbalanced in one sense and for bypassing the other resistor when the bridge is unbalanced in a sense opposite to said one sense.

References Cited in the file of this patent
UNITED STATES PATENTS

| | | |
|---|---|---|
| 2,006,173 | McNairy et al. | June 25, 1935 |
| 2,313,503 | Baldwin | Mar. 9, 1943 |
| 2,315,386 | Baldwin | Mar. 30, 1943 |
| 2,373,314 | Keller | Apr. 10, 1945 |